US010032178B2

(12) United States Patent
Grossman

(10) Patent No.: US 10,032,178 B2
(45) Date of Patent: *Jul. 24, 2018

(54) APPARATUS AND METHOD FOR TARGETED ACQUISITION

(71) Applicant: Victor A Grossman, Staten Island, NY (US)

(72) Inventor: Victor A Grossman, Staten Island, NY (US)

(*) Notice: Subject to any disclaimer, the term of this patent is extended or adjusted under 35 U.S.C. 154(b) by 0 days.

This patent is subject to a terminal disclaimer.

(21) Appl. No.: 15/243,773

(22) Filed: Aug. 22, 2016

(65) Prior Publication Data

US 2016/0358191 A1 Dec. 8, 2016

Related U.S. Application Data

(63) Continuation of application No. 11/999,927, filed on Dec. 7, 2007, now Pat. No. 9,460,578.

(51) Int. Cl.
*H04M 1/00* (2006.01)
*G06Q 30/02* (2012.01)
*G07C 13/00* (2006.01)
*H04M 1/725* (2006.01)
*G01C 21/36* (2006.01)
*H04W 4/02* (2018.01)

(52) U.S. Cl.
CPC ...... *G06Q 30/0201* (2013.01); *G01C 21/3605* (2013.01); *G01C 21/3626* (2013.01); *G06Q 30/02* (2013.01); *G07C 13/00* (2013.01); *H04M 1/72572* (2013.01); *H04W 4/023* (2013.01)

(58) Field of Classification Search
CPC .... G06Q 30/02; G06Q 30/0201; G07C 13/00; H04M 1/72572; H04W 4/023; G01C 21/3626; G01C 21/3605
USPC ......................................................... 455/411
See application file for complete search history.

(56) References Cited

U.S. PATENT DOCUMENTS

2003/0154129 A1* 8/2003 Goff ...................... G06Q 30/02
705/14.15

* cited by examiner

*Primary Examiner* — Charles Shedrick

(57) ABSTRACT

A mobile station, system, and method for collecting information. The mobile station including a controller which can determine a current location of the mobile station, output the name of one or more selected persons corresponding to a predetermined geographic area (such as a current location of the mobile station), and receive an identifier corresponding to the selected person via an input device. The mobile station may also communicate, via wired and/or wireless communication means, with a system for uploading/downloading and/or processing information such as petition signatures.

19 Claims, 12 Drawing Sheets

FIG. 8

APPARATUS AND METHOD FOR TARGETED ACQUISITION

REFERENCE TO PRIORITY APPLICATION

This application is a continuation of copending U.S. patent application Ser. No. 11/999,927, filed on Dec. 7, 2007, and entitled "APPARATUS AND METHOD FOR TARGETED ACQUISITION," the contents of which are incorporated by reference herein.

FIELD OF THE INVENTION

The present invention relates generally to an apparatus having a guidance function and a method for performing the same, and more particularly to an apparatus and method for targeted acquisition or distribution of desired items such as petition signatures and/or charitable contributions.

BACKGROUND OF THE INVENTION

Typically, petitioners are given a list of names of party members who are registered voters in a specific area, from whom valid petition signatures can be requested and obtained. However, it is often difficult quickly and easily to find the registered voters from whom to request and obtain valid signatures. Accordingly, petitioners frequently spend countless hours walking streets and plazas looking for registered voters from whom valid petition signatures can be requested and obtained. Unfortunately, many petition signatures are invalidated when they fail to meet certain standards. For example, in New York state, a State Assembly nominee must obtain several hundred signatures from voters who are members of the same party as the nominee and who live in the nominee's Assembly district. Oftentimes, using conventional petitioning methods, it is difficult to determine whether a particular person is a registered voter, is registered in the proper party, and lives in the proper district, etc. As a result, even the most diligent petitioner may collect invalid, and therefore useless, petition signatures. Accordingly, extra signatures are usually collected to provide a safety net. However, these extra signatures require extra work. Additionally, canvassers often get lost while seeking signatures in unfamiliar neighborhoods, adding to the overall inefficiency of the process Moreover, these disadvantages are exacerbated by the conditions under which canvassers must work. For example, canvassers, who are often unpaid, typically work outdoors in spring storms and summer heat.

Accordingly, there is a need for a system and method quickly and easily to obtain valid petition signatures. Moreover, there is a need for a system and method that can continually update petition information in real-time. Further, there is a need for a system, apparatus, and method for distributing information to targeted individuals.

Moreover, not-for-profit organizations often conduct fundraising in a door-to-door fashion. However, this method is inefficient, as many persons may not be at home and/or may not contribute to these not-for-profit organizations. It is therefore desirable to provide a system, apparatus, and method for targeted fundraising.

SUMMARY OF THE INVENTION

The present invention is directed to a system, apparatus, and a method for collecting petition signatures and corresponding information and using the same.

The present invention may also be directed to a system, apparatus, and method for distributing and/or collecting information based upon location as well as an individuals political party affiliation, voting history, contribution history, etc.

Thus, the present invention provides a mobile station, including a controller which determines a current location of the mobile station, outputs the name of one or more selected persons corresponding to the current location of the mobile station, and receives an identifier corresponding to the selected person; and an input device for inputting the identifier. According to the present invention the controller may output an address corresponding to the one or more selected persons. Further, the controller may use the determined current location of the mobile station to determine guidance information corresponding to an address of the one or more selected persons. Moreover, the controller may output map data corresponding to the determined current location of the mobile station, wherein the map data including route data.

Further, according to the present invention, the controller may select the one or more selected persons from a compilation of registered voters. The compilation of registered voters may include members of a single political party and/or a single voting district. Thus, for example, only members of the Republican party in the $23^{rd}$ congressional district may be included in the database of registered users and or a select route. Moreover, according to the present invention, the identifier corresponding to the selected person comprises one or more of a signature, biometric data, and an identification code related to the corresponding person. According to another aspect of the controller may receive a verification identifier corresponding to a user other than one of the selected persons, and optionally save the verification identifier in association with identifiers corresponding to the one or more selected persons.

It is yet a further aspect of the present invention to provide a method for collecting information using a mobile station including at least one controller, the method including the steps of determining, by the controller, a current location of the mobile station, outputting, by the controller, the name of one or more selected persons corresponding to the current location of the mobile station, inputting, by an input device, an identifier corresponding to a selected person of the one or more selected persons; and processing, by the controller, the identifier corresponding to the selected person. The method may further include outputting, by the controller, an address corresponding to one or more of the selected persons. According to the method, the controller may output guidance information corresponding to an address of one or more of the one or more selected persons. The method may further include outputting, by the controller, map data corresponding to the determined current geographic location of the mobile station, the map data including route data corresponding to a route having a plurality of addresses each corresponding to one or more of the one or more selected persons.

It is also an aspect of the method of the present invention to include selecting, by the controller, one or more selected persons of the one or more the selected persons from a voter registration database. According to the method, the one more selected persons may be selected from a group including only members of a single political party. Further, the method may include receiving, by the controller, information related to an identifier corresponding to the selected person, wherein the identifier includes one or more of a signature, biometric data, and an identification code related to the selected person. According to the method, the controller may receive a verification identifier corresponding to a user other than one of the selected persons, and save the verification identifier in association with the information related to the identifiers corresponding to the one or more selected persons.

It is yet another aspect of the present invention to provide method for collecting information using a mobile device having a controller, the method including the steps of outputting, by the mobile device, a name of a selected person from a list of selected persons, inputting an identifier corresponding to the selected person, and processing, by the controller, the input identifier. According to the method, the identifier may include one or more of a signature, biometric data, and an identification code, related to the selected person. The method may also include determining whether the selected person is registered to vote in a predetermined geographic area. The method may further include transmitting the identifier corresponding to the selected person to a base station. According to the method, the input identifier corresponds to a petition.

It is also an aspect of the present invention to provide a method for guiding a user such as, for example, a petition collector, to a voter who is registered to a predetermined political party.

It is a further aspect of the present invention to provide a system, apparatus, and a method for soliciting a petition. The apparatus including an input device for receiving a petition.

Additional advantages of the present invention include the incorporation of features that provide a simplified method for identifying voters and collecting their signatures in a reduced time period, thus aiding the collection of, for example, petition signatures for a nominee's placement on a ballot.

BRIEF DESCRIPTION OF THE DRAWINGS

The invention is herein described, by way of example only, with reference to the accompanying drawings, wherein:

FIG. 8 is a screen shot of an exemplary verification information screen for verifying data collected according to the present invention;

DETAILED DESCRIPTION OF THE INVENTION

Preferred embodiments of the present invention will be described in detail with reference to the annexed drawings. In the following description, a detailed description of known functions and configurations incorporated herein will be omitted when it may obscure the subject matter of the present invention.

Figure 1:
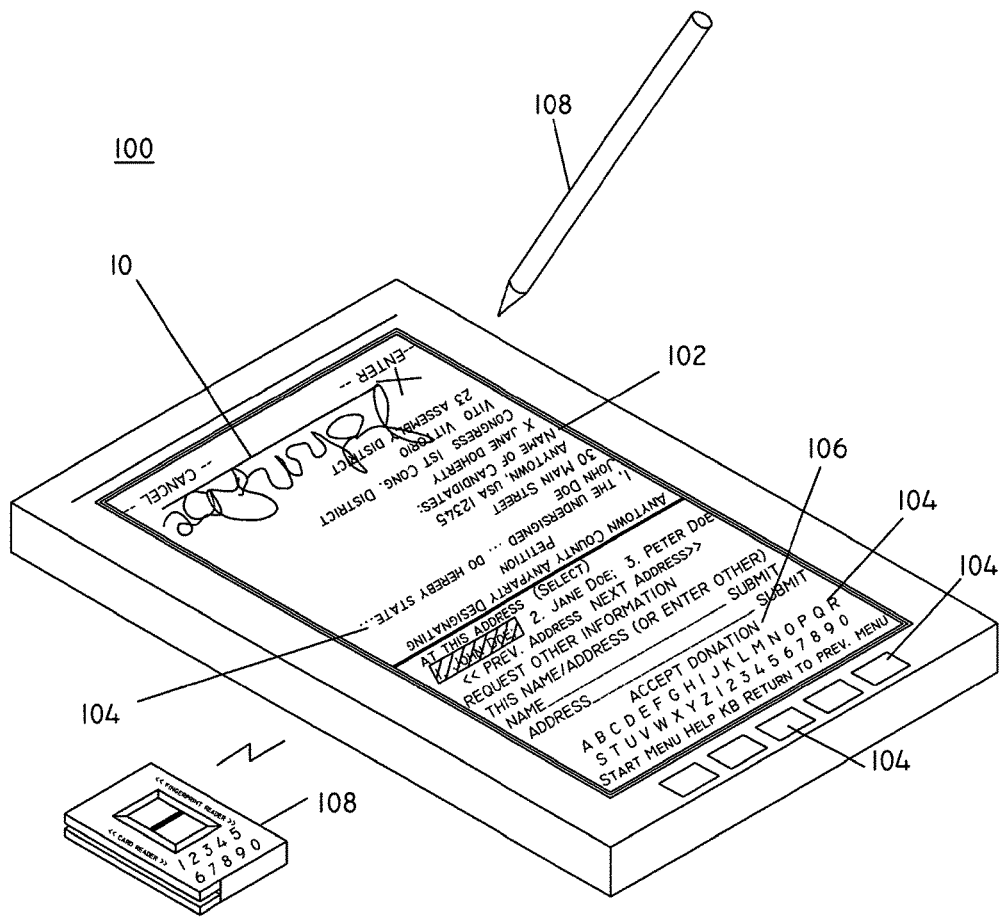
FIG. 1 is a perspective view illustration of the mobile device according to the present invention.

A perspective view illustration of the mobile device according to the present invention is shown in FIG. 1. A mobile device 100 includes a display 102 for displaying desired graphics and/or text and an optional input device 104 which can include alphanumeric keys, function keys, soft keys, etc. The display 102 can include an LCD (liquid crystal display) or other suitable display and may include a touch-sensitive screen for entering a selection (e.g., a signature, a soft key, etc.). An optional stylus 108 or other device may be used to enter an input (e.g., sign a name, select objects, etc.) using the optional touch screen. When the mobile device 100 is located at a target location (such as, for example, a desired address), the mobile device 100 may switch from a navigation mode (e.g., a mode in which map, route, guidance, address and/or names of targeted persons are displayed) to a location mode for inputting identification information. As shown, the screen may display text in two directions so that a targeted person such as a petitioner (e.g., "John Doe"), a contributor, etc. can easily provide a signature (e.g., for a petition), and a user situated opposite the petitioner may readily make other selections e.g., approve of a signature, select another person (e.g., "Jane Doe"), etc. However, such a display is not necessary.

Further, the mobile device 100 may include a sensor 108 for inputting data such as financial data (e.g., credit/debit cards, etc.) and/or biometric data (e.g., fingerprints, handprints, iris identification, etc.). The sensor 108 may be formed integrally with the mobile device 100 or may be coupled to the mobile device 100 using, for example, a wired or wireless (e.g., Bluetooth) link, and can read data such as, from credit/debit cards, etc. so that targeted persons may easily make contributions. Accordingly, a donation selection such as a soft donation key 106 may be provided on, for example, the touch-screen display 102 for selecting to contribute to, for example, a cause (e.g., a charity, an organization, a fund, a candidate, a political party, etc.). Although not shown, screen 102 may include tabs or other navigation aids as will be described below for navigation. When the donation key 106 is selected, a donation/contribution form such as, for example, screen 700 (e.g., see, FIG. 7) may be displayed for the convenience of, for example, the user.

Figure 2:
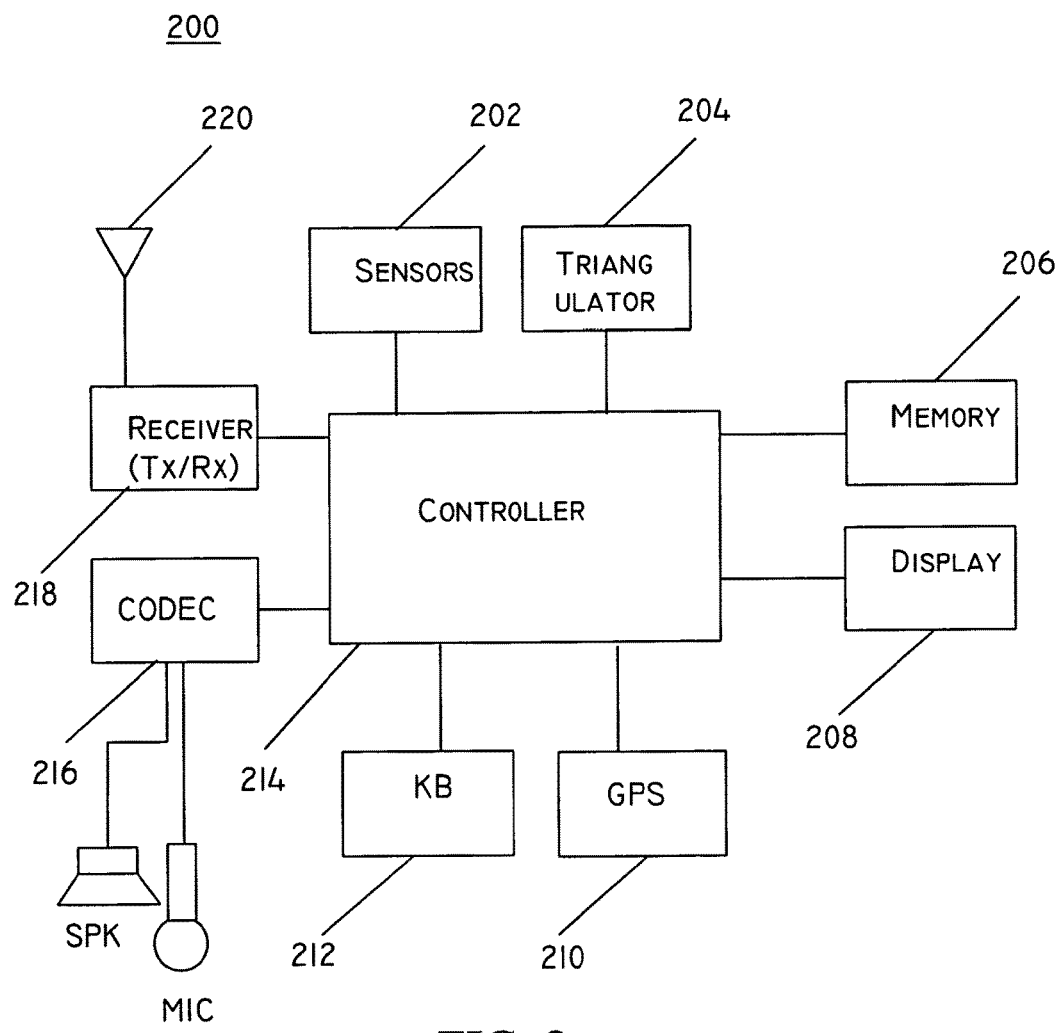
FIG. 2 is a detailed block diagram illustrating the schematics of the mobile device according to the present invention.

A detailed block diagram illustrating the schematics of the mobile device according to the present invention is shown in FIG. 2. A mobile device (mobile station) 200 includes a controller 214 which may be coupled to (or formed integrally with) one or more optional devices, such as, for example, a sensor module 202, a triangulation module 204, a memory 206, a display 208, a GPS (global positioning system) module 210, an input module such as a keyboard and/or touch-screen input device 212, a CODEC (COder/DECoder) 216, and a transmitter/receiver (Tx/Rx) 218. Any of these modules (e.g., 202-212, and 216-218) may be incorporated within the controller 214.

The controller 214 controls the overall operation of the mobile device 200.

The sensor module 202 is an optional module which includes sensors such as, for example, a single- to a three-axis (i.e., x, y, and/or z axis) accelerometer for providing acceleration data to the controller 214. The sensor module may also include a magnetic sensor which may determine the orientation and/or strength of a magnetic field (such as, for example, the Earth's relative to a given direction (e.g., north) for use by the controller. Accordingly, the controller 214 may determine the orientation of the mobile device 200 using magnetic field data and/or acceleration data, GPS data, etc.

The triangulation module 204 is an optional module which is used to provide triangulation location information to the controller 214. The triangulation module 204 may use conventional triangulation routines to determine the location of the mobile device 200. Accordingly, the mobile device 200 according to the present invention may use wireless transmissions (e.g., cellular transmissions) to determine the location of the mobile device 200. Further, the mobile device 200 may receive location information from a system (not shown) in which the mobile device 200 operates. As methods and systems to determine location of mobile devices are well known in the art, for the sake of clarity no further description will be given. Further, the mobile device 200 may determine its location using location information received from a system in which it operates.

The memory 206 can include static and/or dynamic memory (e.g., RAM/ROM, flash memory, a hard-disc, etc.) as is known in the art. The memory can be used to store various information such as, for example, operating programs, generated information (e.g., program data, signatures, etc.), etc. that is generated by the mobile device 200.

A display 208 displays information which can include text and/or graphic data, as necessary, under control of the controller 214. The display can include an LCD (liquid crystal display) or other display, as desired. Moreover, the display may include a touch-sensitive screen for entering data.

The GPS module 210 may receive satellite guidance information from one or more satellites and generate GPS location information corresponding to the location of the mobile device 200. As GPS location information systems are well known in the art, for the sake of clarity, no further description will be given.

The keyboard (KB) 212 may include one or more input keys (e.g., alpha and/or numeric input keys, navigation keys (e.g., up, down, left, right), and/or function keys), as desired, for generating corresponding key inputs. Moreover, the KB 212 may include keys which correspond to a display input (e.g., a soft key). The KB 212 may be controlled by the controller 214 and can transmit generated key inputs to the controller 214.

The CODEC 216 may be controlled by the controller 214 and transmits/receives data to/from a speaker (SPK) and/or microphone (MIC) as shown. The CODEC 216 can convert a voice (e.g., an analog input) to a desired format (e.g., digital) and can convert a desired format (e.g., a digital format) to an analog format for outputting as, for example, audible data. The SPK, MIC, KB, etc., may be coupled to the controller via wired or wireless means. For example SPK and MIC may include a wireless headset such as a Bluetooth™ headset which communicates wirelessly to the controller.

The transmitter/receiver (Tx/Rx) module 218 may transmit/receive information using desired formats, such as conventional wireless device formats under the control of the controller 214. For example, the Tx/Rx module 218 may transmit and/or receive information to or from conventional wireless (e.g., cellular) base stations using, for example, TDMA, CDMA, GSM, etc., communication techniques. Moreover, the Tx/Rx module 218 may transmit/receive information using wireless protocols such as, for example, Bluetooth, WiFi, WiMax, WiBro, etc., as are known in the art. Accordingly, as wireless communication systems and protocols are well known in the art, for the sake of clarity, a further description will not be given. The Tx/Rx module 218 may include means (not shown) for amplifying, filtering, upconverting and/or downconverting transmission and reception signals, respectively, as is well known in the art. Moreover, diversity means (not shown) may also be included for the transmission and/or reception of data.

Figure 3:
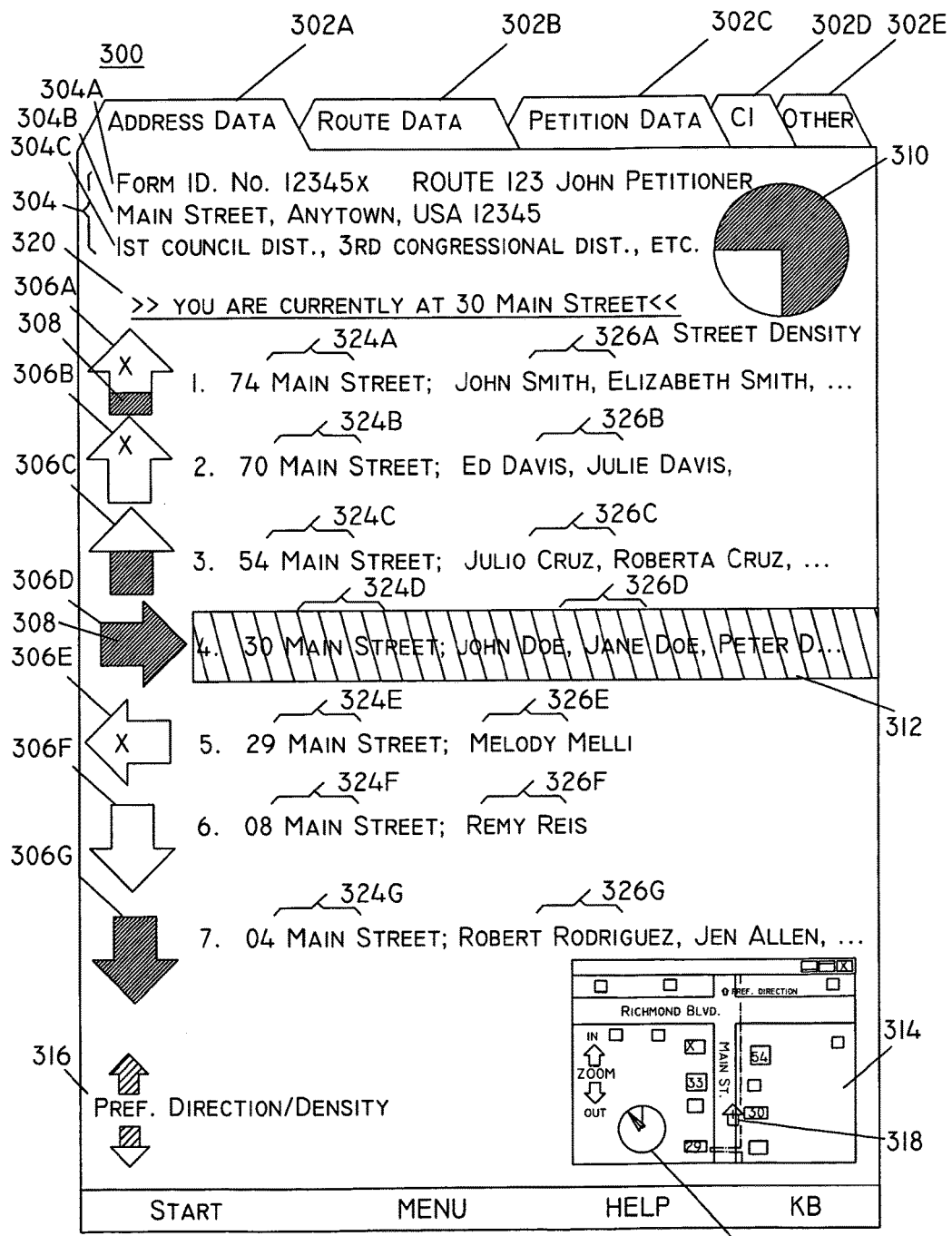
FIG. 3 is a screen shot illustrating a navigation screen according to the present invention.

A screen shot illustrating a navigation screen according to the present invention is shown in FIG. 3. A screen 300, includes various kinds of information, such as, for example, address information, which can be displayed according to, for example, current location. Screen 300 may include one or more of form information 304, density information 310, selected address information 324A-G, selected name information 326A-G, direction information 306A-G, preferred direction information 316, current map information 314, and current location information (e.g., see, 318 and 320).

The density information 310 may indicate for example the number of individuals from whom a valid signature (or contribution) may be (or is expected to be) obtained on the corresponding block/street, route, etc. This information may be output using, for example, a graph such as, for example, a pie chart, a bar chart, or other visual and/or audio means. Accordingly, various methods (e.g., computer programs) may be used to compile data about individuals from whom valid petition signatures (or votes, contributions, etc.) were previously obtained (e.g., by time, date, location, etc.). Then, this information may be used to calculate a current expectation (e.g., probability). This information may be referred to as "expectation data." For example if "John Doe" has not signed a petition (or contributed to a charity, etc.) for a predetermined time, this information would be saved in a database (DB—not shown), and information indicative of the likelihood that John Doe will sign a petition (make a contribution, etc.) may output, via, for example, the display, for the convenience of the user. Accordingly, upon determining that (e.g., by the controller 214), for example, it is unlikely that John Doe will be available to sign a petition, this information may be displayed on the screen 102 so that the user (e.g., a signature collector) may save time and effort by bypassing John Doe's residence. Expectation data and/or other variables (e.g., a preferred direction, etc.) may be calculated, using for example, Heuristic and/or other analysis with inputs such as, for example, time data, signature data, contribution data, history data, etc. Heuristic analysis and other methods to, for example, detect probability, etc., are well known in the art, and for the sake of clarity, a further description thereof will not be given. The density information may provide information on or more of a block, a route, a street, an address, a person, etc., as desired.

The form information 304 may include for example, one or more of form-type information 304A, signature-collector information (e.g., "John Petitioner") address information 304B, and/or district information 304C, etc. The form-type information 304A may include an identification (ID) number which may be used to identify a current form and other data (e.g., a signature collector's identification, time information, etc, which may or may not be displayed). This information may be saved with other collected information for later identification and use. The address information 304B may indicate, for example, a current location such as, for example, a current street location. The district information 304C may indicate election area information (e.g., 23 Assembly District, 63 Congressional District, etc.), candidate information (not shown), and other desired information.

The address information 320 may include, for example, current location information such as, for example, current street address information, as shown.

The selected name information 326A-G may include information relating to a selected person's identification (e.g., name information of, for example, a registered voter, a contributor, etc.).

The selected address information 324A-G may include selected address information which may correspond to the selected name information 326A-G. However, the selected address information 324A-G may be output (e.g. displayed) with or without the corresponding selected name information. Likewise, the selected name information 324A-G may be output (e.g., displayed) with or without the selected address information 324A-G.

In the present example, the selected address information 324A-G is sorted in order of a route direction (e.g., by address number and/or direction of travel). However, other sorting options and/or options to change the sorting may be provided. For example, a user may be provided with an option to sort by expectation data, name, reverse route direction, current direction, etc. A current address (e.g., an address corresponding to a current location, e.g., of the mobile device 200) may be distinguished using, for example, highlighting 312.

The direction information may include direction indicators 306A-G which are preferably output (e.g., displayed) with one or more of the corresponding address information 324-G and/or name information 326A-G. As shown, the direction information 306A-G includes directional elements (e.g., arrows) which may, for example, indicate a direction of a selected name and/or address in relation to a current path or orientation of the mobile device 200. For example, using the determined orientation of the mobile device 200, the mobile device 200 may display the direction information using for example, direction elements such as direction indicators 306A-G to direct a user to the selected name and/or address (324A-G, 326A-G). Thus, the direction indicators 306A-G may have an orientation which corresponds to an address relative to the orientation of the mobile device 200. Accordingly, the direction indicators 306A-G may use a continuous sweep, discrete sweeps (e.g., 0, 90, 180, 270 degrees—corresponding to right, forward, left and reverse directions, respectively), as shown, etc. In an alternative embodiment, the direction information 306A-G may be orientated to correspond to a desired path along a street rather than the absolute orientation of the mobile device 200. Accordingly, a user selection may be provided so that a user may select a desired direction information output.

Although not shown, the selected address information, name information, and/or the corresponding direction information may be displayed according to direction of travel and/or a side of a street (e.g., a sidewalk) upon which the mobile device 200 travels, or a side of a street corresponding to a desired route. For example, if first and second sidewalks are respectively located on opposite sides of a street and the mobile device 200 is located on the first sidewalk, the displayed direction information may include only addresses (and other information) on that side of the street (e.g., side of a roadway). Accordingly, the controller may determine which side of a corresponding street the mobile device is located on and display only information (e.g., location information) corresponding to the determined side of a that street. It is also envisioned that a user may select a desired side of a street so that only information corresponding to the desired side (e.g., only addresses and corresponding information for the desired side) may be displayed. Accordingly, the mobile device 200 may be equipped with means for determining on which side of a street (e.g., a roadway) the mobile device 200 is located.

The direction information 306A-G may also include information related to a corresponding address, such as expectation data 308, which may indicate, for example, the expected likelihood of success (e.g., of obtaining one or more petition signatures, a contribution, etc.) at the corresponding address. For example, in screen 300, the direction indicator 306D may include, for example, a filler within the direction indicator (indicator arrow), which can be used to indicate the likelihood of success. Accordingly, a full filler (e.g., see, 306D) indicates a high likelihood of success in obtaining a desired item such as, for example, a petition signature). Conversely, the lack of a filler in a direction indicator (e.g., see, 306F) indicates that the corresponding address e.g., "08 MAIN STREET," would have the lowest likelihood of success. The likelihood of success may be illustrated using, for example, the fill bars as shown. However, other audio and/or visual methods to illustrate the likelihood of success may optionally also be used.

The display 300 may also include information relating to current status information which may indicate whether any signatures or other items (e.g., donations, etc.) have been collected, or information such as, for example, literature, multimedia files, etc., output (e.g., transmitted or played) at a corresponding address. Accordingly, current status information may include audio and/or visual information such as, for example, the "X" illustrated next to a corresponding address and/or name to indicate current status. Further, after an address has been visited, a signature (e.g., a petition signature) has been obtained, or a donation has been received, etc., the corresponding address and/or name information may be removed from a current display, de-highlighted (e.g., using gray scale, changing font color), etc., so that current status may be readily ascertained, if desired. Accordingly, the controller 214 may set/reset one or more flags (e.g., in a data field which corresponds with the selected address and/or name information) to indicate whether a desired object (e.g., a signature, a contribution, etc.) was obtained, the selected address and/or person visited, multimedia data played, etc.

On screen 300, information relating to the selected address and/or name information (e.g., 324A-G, 326A-G) may be selected by a user or may be automatically highlighted by the controller 214 when it is determined that the current location of the mobile device 200 corresponds to a predetermined address. For example, when it is determined that the mobile device 200 is located within a predetermined distance of "30 MAIN STREET," then "30 MAIN STREET" may be selected by, for example, highlighting or otherwise distinguishing the selection. For example, audio (e.g., a voice, a beep, etc.) and/or visual information may be used to inform the user of the selection. Accordingly, the user may, for example, change directions and/or walk up a walkway to "30 MAIN STREET" in response to the output information. The controller 214 may then detect either a change in velocity, location, a user's selection, etc., and determine that information relating to "30 MAIN STREET" should be displayed as will be illustrated in FIG. 4.

Referring back to FIG. 3, the preferred direction 316 information indicates a preferred direction of travel which may be determined using several parameters such as current direction (e.g., traveling north on MAIN STREET), planned route information (e.g., pre-selected route, shortest route, etc.) and/or other variables. For example, the present invention may dynamically reroute a user based on information obtained from, for example, a network and/or other users. For example, if the controller 214 (and/or another network device such as a mobile station) determines that another user has already collected information on a street which was mapped to the current user, the controller 214 may revise various information such as route path, map information 314, address and/or name information 320, density information 310, etc., in real time.

The optional map information 314 may illustrate relevant information corresponding to a current location. For example, the map information 314 may include items such as a map of "MAIN STREET," corresponding information such as a preferred route/direction of travel, address information relating to the selected address and/or name information, etc., and a current (actual) direction indicator 322 and a preferred direction indicator 318. The current direction indicator 322 outputs the actual direction of the mobile device 200 relative to a preferred direction (e.g., see single line in circle) so that a user may properly orientate the mobile device 200 relative to a desired path, address, street, etc. The map information 314 may open in a sub-window as shown and may be maximized, minimized and/or closed depending upon a user's preference.

Although not shown, the display may also indicate current time, estimated finish time, current time spent, etc., as desired. Accordingly, a user may readily know whether he is running slow, etc. Additionally, the controller may include a time field in data that is saved to the memory for further use. For example, when a petition signature is obtained, the controller may include a time and/or date stamp which corresponds to the time the signature was obtained, saved to memory, and/or processed, etc.

In an alternative embodiment, the device according to the present invention may output information using the speaker SPK, in which case information may or may not be output to the display depending upon various setting. Accordingly, directional information such as directional instructions on which way to proceed, and selected name and/or address information, name information, etc., may be output via the SPK (or another speaker) to guide the user.

An illustration of information corresponding to the highlighted entry of FIG. 3 is shown in FIG. 1. In the present example, the highlighted entry (i.e., the fourth entry in FIG. 3) has been selected by the controller 214 based on location information and/or a user's selection (e.g., a user selecting a highlighted entry). Accordingly, information relating to "30 MAIN STREET" is displayed as is shown in FIG. 1. When more than one name is associated with a selected address, a default name may be selected by default or may be selected by a user. For example, previous history data may be analyzed and the default person setting set to correspond with the most likely person to perform a certain act (e.g., sign a petition, donate, etc.). Further, a user may select the highlighted name or another name if, for example, more than one registered name is associated with a desired address, In the current example, all names associated with a selected location are illustrated. Thereafter, a user selects a desired person (or corporation, entity, etc.) by, for example, selecting the name (e.g., on a touch screen), by selecting a box corresponding to the name, etc. However, other methods of selecting an individual may include biometric verification (e.g., voice prints, eye-prints, fingerprints, face data, hand structure, genetic data, etc.) or ID data (e.g., identification card data, credit/debit card data, etc.). For example, the mobile device according to the present invention may use fingerprint data, a voice print, etc. to select a desired person. For example, if the mobile device according to the present invention determines that Jane Doe has input her biometric data (e.g., via a fingerprint), then Jane Doe's information may be displayed and her identification information (e.g., a signature) input (e.g., in an identification input mode). After information about a user (e.g., "John Doe's" signature) is entered, the information (e.g., the signature) may be entered into the memory 206, processed, transmitted (e.g., to, for example, a database (DB) or another system) for processing. Thereafter, if information about another selected person (e.g., Peter Doe) is desired, the user may select that other person's information (e.g., by highlighting or otherwise selecting, for example, "Peter Doe's name), which may then be entered, processed and/or saved in, for example, the memory 206, similarly to the previous name. Although only name/signature information is shown as being entered, other information may be saved with, or instead of, the name/signature information. For example, the mobile device 200 may present questions and store answers to these questions. Further, biometric information may be used rather than name/signature information. For example, the sensors 202 of the mobile device 200 according to the present invention may also include an identification (ID) card reader, a credit/debit card scanner, a fingerprint sensor, a handprint sensor, a genetic sensor (e.g., a DNA sensor), an eye sensor, a face scanner, etc., to identify the person from whom data is requested (e.g., a voter, a donor, etc.). Accordingly, the person from whom data is requested may be readily identified and/or other information or data (e.g., charge card information—which can be used, for example, for making a donation) may be obtained. Further, the mobile device may use voice-recognition software to determine or save a person's voice print. Accordingly, upon determining that a certain voice belongs to, for example, Jane Doe, her personal information may be displayed and a corresponding identifier (e.g., a signature) entered without requiring a user to select her name. Further, an audio "signature" may be collected from a handicapped user (e.g., an amputee, a blind person, etc.) by saving a desired voice clip as identification information. Accordingly, a voice clip recording option may be displayed for a user's selection.

When information relating to a selected address and/or person has been collected, the device according to the present invention may return to a predetermined screen for a user's convenience, if desired. Thus, for example, the device according to the present invention may return to a predetermined screen, such as, for example, screen 300 after a selected person's signature is entered.

Further, the mobile device 200 according to the present invention may also output (i.e., distribute) information to selected addresses and/or to selected individuals at selected times. For example, when collecting information (e.g., a donation, identification information such as, for example, a signature, etc.) corresponding to a selected person, certain selected information may be output (e.g., via the display 208 and/or speaker SPK) to the selected person. Further, this information may be output at a predetermined time such as, for example, when information is being collected (e.g., a signature is being entered, after it is entered, etc.) or when otherwise selected. For example, when it is detected that a voter or donor, for example, is present (e.g., when a voter's signature is being input, the person's name is selected, a credit card is swiped, etc.), selected information such as, for example, a voice clip from a political figure, a clergyman, etc., may be output. This adds a personal touch to the device according to the present invention. Further, the output information may be selected according to a predetermined routine. For example, information about the selected person (or address) from whom (or which) data such as a signature is being collected may be processed, and thereafter, the controller may determine which information (from a plurality of information) to output. For example, information may be selected according to sex, age, health, marital/family status (e.g., married with five children), religion, education, location, wealth, other personal preferences, etc. Thus, if, for example, it is determined that the selected person is 28 years old, then information which is determined to be relevant for those under 30 years of age may be output. For example, when it is determined that the desired person is over 65 years old, information relating to, for example, elder health care and/or Social Security may be output. Further, this information may include a recommendation as to selected actions. Further, the present invention may also use GPS data and altitude data to store desire information (e.g., a number of steps that were climbed) with location information for later use.

Referring back to FIG. 3, screen 300 may include optional index tabs such as, for example, 302A-302E, which may be selected to display a corresponding page (screen). The index tabs 302A-302E are preferably displayed according to, for example, importance. The index tabs 302A-302E are exemplary in nature, and it is envisioned that many other indexes and/or menus may be used as desired. It is also envisioned that a user may set indexes to be displayed as desired, using, for example, a program for setting the indexes. In the present example, information such as, for example, one or more of address information 302A, route information 302B, petition information 302C, candidate information 302D, other information 302E, etc., may be displayed on the screen for a user's selection.

Figure 4A:
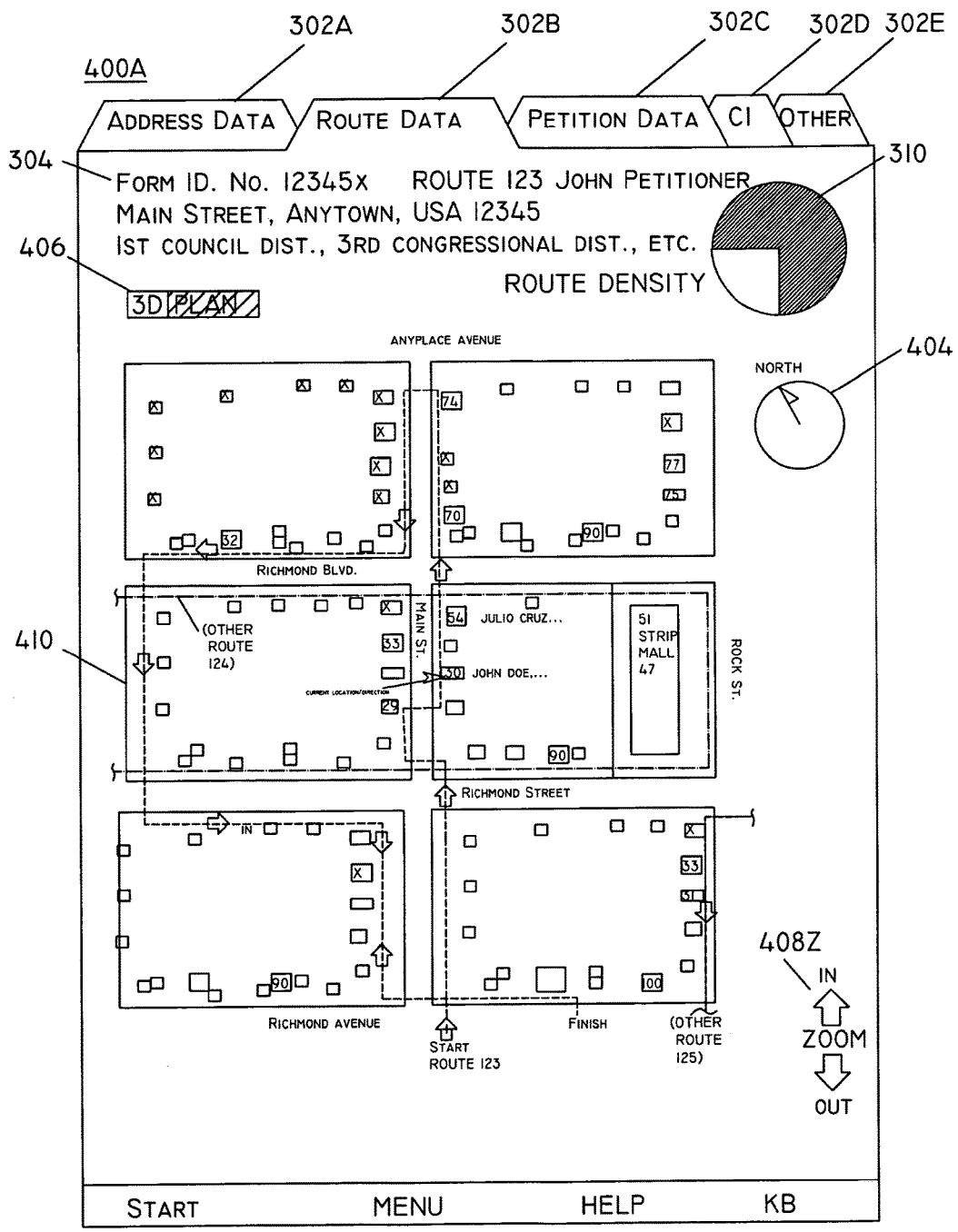
FIG. 4A is a screen shot illustrating a screen corresponding to route information according to the present invention.

A screen shot illustrating a screen corresponding to route information according to the present invention is shown in FIG. 4A. With reference to screen 400A, a desired route may be displayed in accordance with, for example, a desired user (e.g., signature collector such as, for example, "John Petitioner"). The route information is preferably superimposed upon, for example, map information 410, and may include one or more routes which may include a selected route (e.g., route "123" as shown). Additionally, other information corresponding to the map information may be displayed, as desired. For example, street names, addresses, and current status information may be displayed on the map data. Accordingly, a symbol such as an "X" may be displayed on the map data to indicate a signature has already been obtained, etc., at a predetermined location. Preferred route information may include direction indicators, etc. Moreover, start and finish locations may also be output, as shown. Further, directional data such as absolute compass data 404 may be provided to indicate a desired direction with reference to the map information. Further, although not shown, a current direction indicator such as the direction indicator 322 may also be displayed on screen 400A or 400B for the user's convenience, if desired. The directional indicators and/or other information may be updated in real time and/or may be displayed relative to displayed map information or other information. Optionally, a user may select among several different map views. For example, a user may select among street names only, a satellite (or planar) view (including, for example, pictures or graphics of houses, buildings, etc.), a 3-D view (shown in FIG. 4B below), etc., as desired, using, for example, selector 406, index tabs, menus, etc. Further, historical information may also be displayed and/or collected during use. For example, information relating to topography (e.g., hills, stairs, etc.) may be collected and/or displayed during use, as desired.

Although not illustrated, other route information may be displayed. Further, an option to select a new route, modify a route, add a route to an existing route (e.g., concatenate a route), etc. may also be provided for the user's convenience. For example, a user may combine two or more routes, if desired, to form a longer route. Further, the device according to the present invention may determine a shortest route when combining two or more routes so that resources are conserved according to one or more criteria (e.g., distance, time, other weighing factors, etc.). Moreover, other routes may be displayed and selected by the user (e.g., by clicking on the other route). Accordingly, user information will be updated with the new route. Further, the mobile device and/or system may include software to determine a shortest route, if desired. As such software is known in the art, for the sake of clarity a further description will not be provided.

Figure 4B:
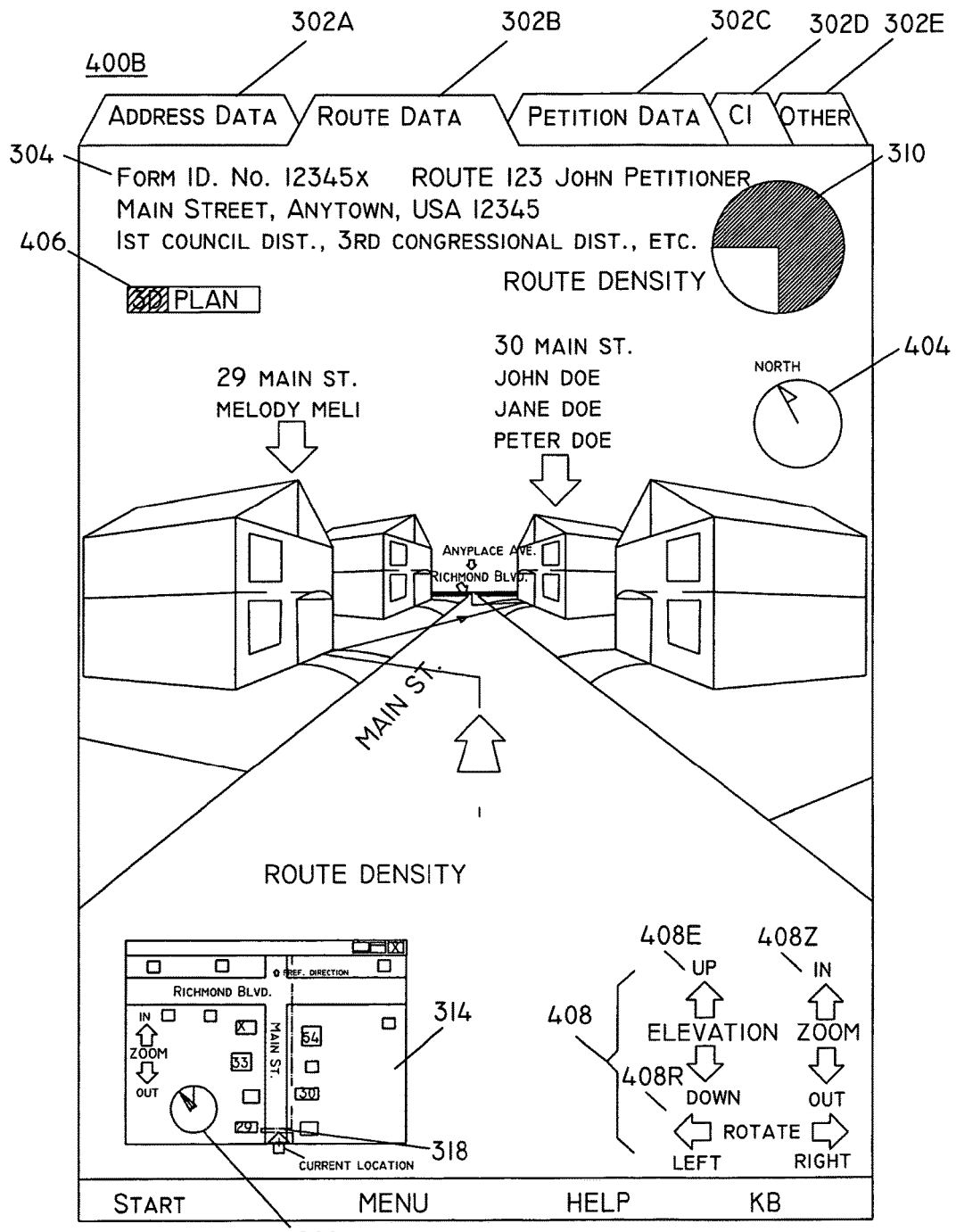
FIG. 4B is a screen shot illustrating another screen corresponding to route information according to the present invention.

A screen shot illustrating anther screen corresponding to route information according to the present invention is shown in FIG. 4B. Screen 400B is a 3-D map view (e.g., a perspective view) which corresponds with the planar view screen 400A shown in FIG. 4A. One or more optional navigation selections such as zoom, rotate, and elevation, 408 may be selected to change the corresponding settings. Current map information 314 is optionally displayed in, for example, a minimized window, and corresponds to the current location of the mobile device 200. The current map information 314 may be displayed in planar form (as shown), or may be displayed in 3-D form. Selected addresses and/or persons may be distinguished using for example, highlighting and/or arrows, etc., as desired. Thus, for example, by selecting the name "John Doe" on the current screen, the controller 214 will display, for example, petition (or other) information related to John Doe such as is shown in FIG. 1. In other embodiments, selecting a person's name will optionally open a donation screen etc., for accepting a donation. An elevation selection 408E adjusts the elevation of the screen display. Accordingly, adjusting the elevation selection to 90 degrees will yield a "birds-eye" view, while adjusting the elevation to, for example, a few degrees will result in a "street-level" view. Likewise, selecting a zoom selection 408Z will zoom the screen in or out, and selecting a rotate selection 408R will rotate a view (e.g., 0-360 degrees) around a predetermined point.

Figure 5:
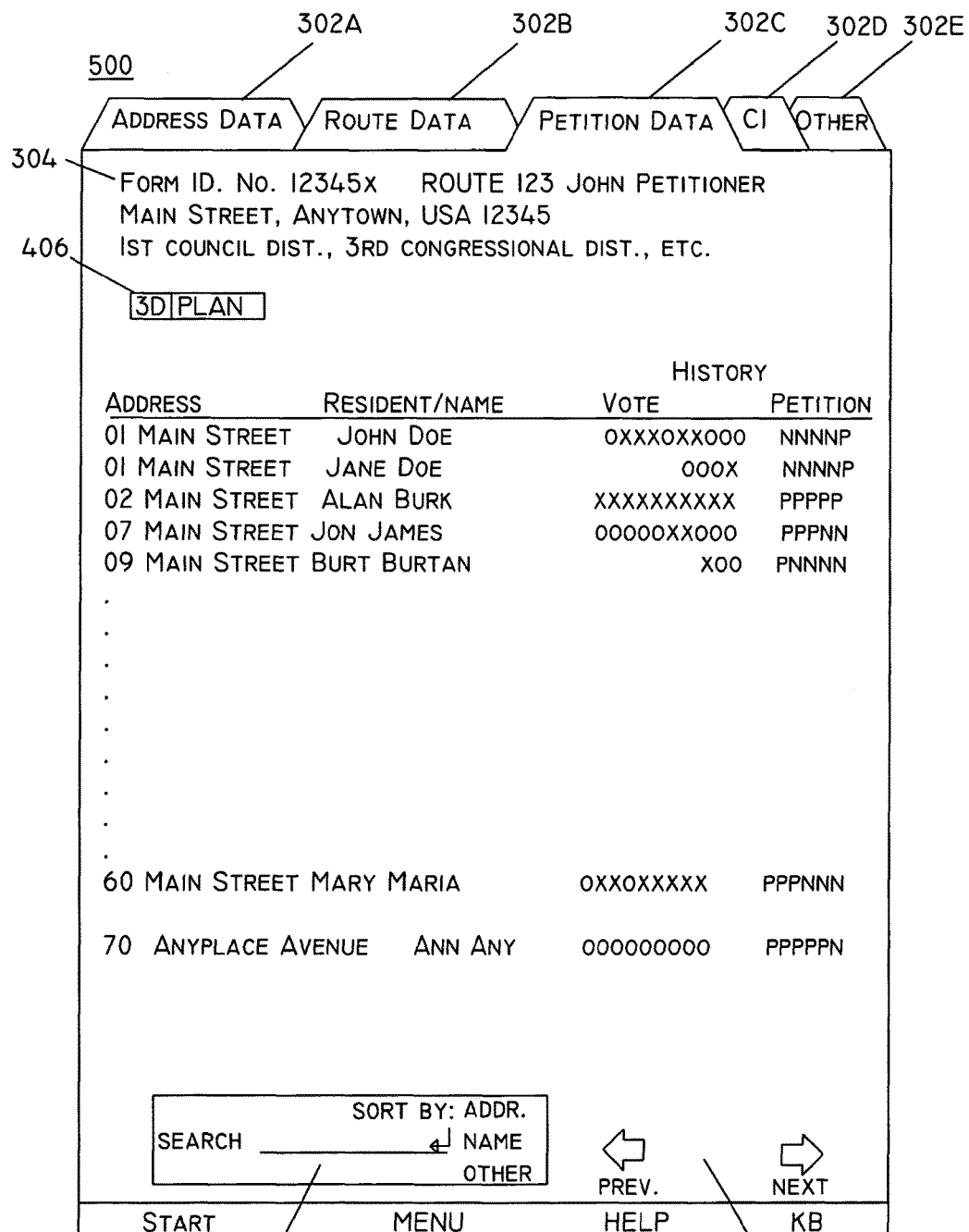
FIG. 5 is a screen shot illustrating a screen corresponding to petition information according to the present invention.

A screen shot illustrating a screen corresponding to petition information according to the present invention is shown in FIG. 5. Historical information such as, for example, petition information may include information related to a selected person (e.g., a voter, a donor), a user (e.g., a signature collector—"John Petitioner," a fundraiser, etc.), location information (e.g., address information), information corresponding to the location information (e.g., personal information), present location information (e.g., of the mobile device 200), tracking information (e.g., actual location information corresponding to a travel route of the mobile device 200), donation information (e.g., whether a person has donated money and/or services), petition information (e.g., a selected person's previous petition-signing history), voting information (e.g., a person's voting history), party history (a person's previous party membership information). As shown, the historical information includes selected address, selected name, and previous voting and/or signing (or donating) history. A part of this history may be displayed, if desired. For example, as shown in FIG. 5, an "x" indicates voting participation while an "o" indicates a lack of participation (i.e., the individual did not vote). Likewise, a "p" indicates that the corresponding person signed a petition, while an "n" indicates that the corresponding person did not sign a petition. Further, by selecting a name, address, etc., other relevant information about the name, address, etc., may be displayed. Further, if desired, certain information fields may be removed from the display (e.g., not displayed), which can provide an enhanced level of privacy. Moreover, a user such as, for example, a signature collector may have a given privilege level that may allow him to view and/or access certain information. Accordingly, a user with a higher privilege level may be allowed to view other information that the user with a lower privilege level will not be allowed to view and/or access. Accordingly, various information fields such as, for example, a history field, etc., may be assigned certain privilege levels which must correspond with (or, for example, be lower than) a user's privilege level in order for it to be accessed and/or viewed by the user. Further, a user may select which information is displayed, to enhance a user's convenience. For example, if selected, only personal information relating to a current address may be displayed. A search input query box 504 allows a user to enter a desired search term (i.e., search data) and perform a search for relevant data corresponding to the search term. Further, navigation inputs (arrows) 506 allow a user to navigate between previous and next screens which may correspond with selected address information, selected street information, selected person (name) information, previous/next screens, previous/next tabs or menus, etc., as desired. In the present embodiment, it will be assumed that selecting one of the arrows 506 will display previous or next screens corresponding to address data. For example, selecting the "next" arrow of the arrows 506 will display a screen corresponding to the following street in the current route (i.e., route 123).

Figure 6:
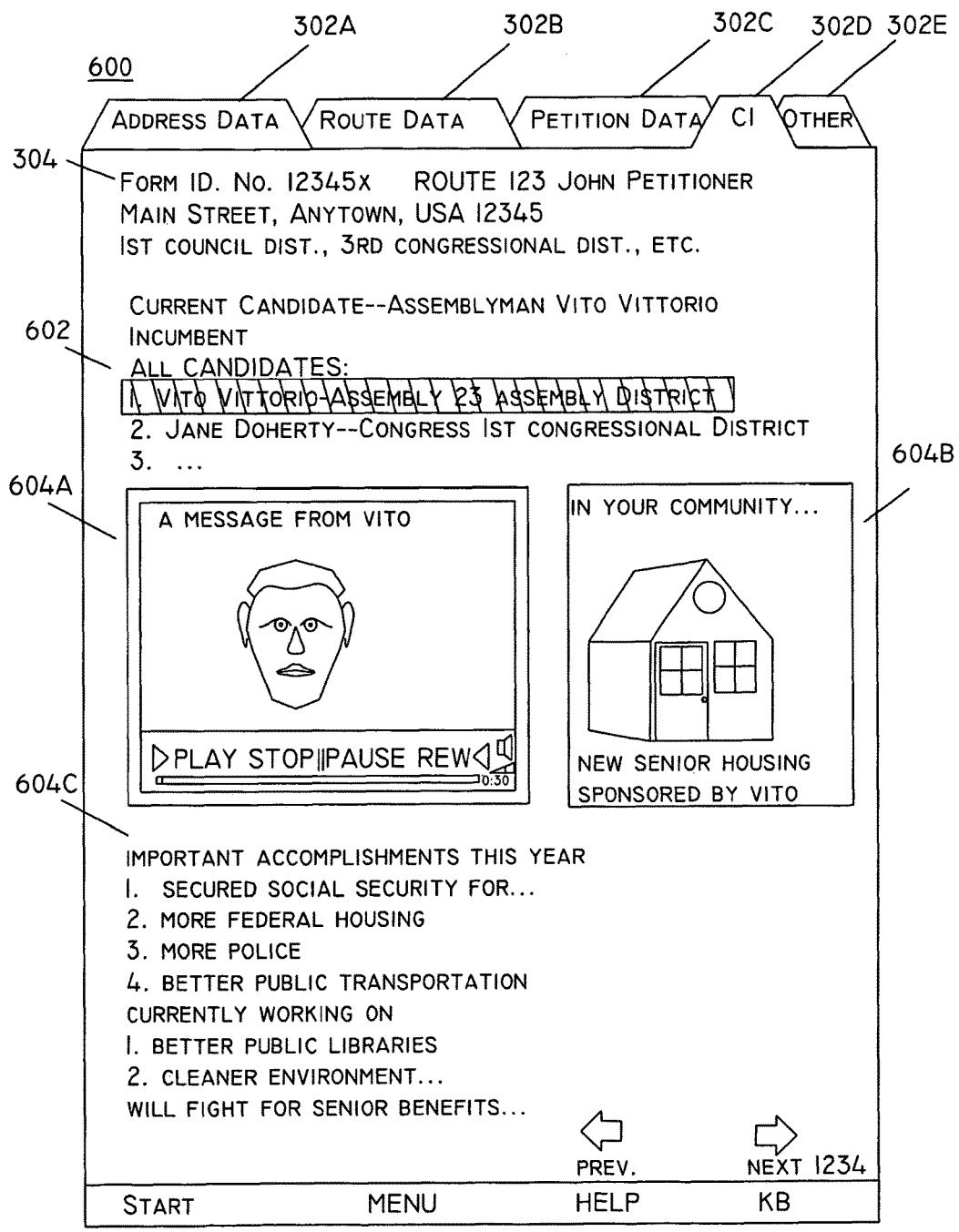
FIG. 6 is a screen shot illustrating a screen corresponding to candidate information (CI) according to the present invention.

A screen shot illustrating a screen corresponding to "candidate information" (CI) according to the present invention is shown in FIG. 6. As shown, information about one or more candidates, important persons, and/or other entities (e.g., political figures, religious figures, political parties, organizations, corporations, etc.) may be displayed. For example, screen 600 may include information relating to one or more of candidate information 602, message fields 604A, 604B, 604C, etc. The message fields 604A-604C may include standard information or targeted information. The standard information is uniformly output (i.e., displayed), while the targeted information is targeted to a location, a person, etc., as desired. For example, upon determining that a targeted person (e.g., "John Smith") is over the age of 65, message field 604B may include information targeted to a senior citizen. Conversely, upon determining that Peter Smith is 18 years old and in college, information relating to student aid may be output in field 604B. Accordingly, the controller 214 may use various inputs such as, for example, time, location, selected address information, selected person information (e.g., age, sex, marital status, voting history, previous signatory/contribution history, religious affiliation, profession, work status, etc.) to determine appropriate information output in one or more of the fields 604A-604C. Additionally, the controller 214 may use heuristic analysis using these various inputs to determine desired information to output. Further, weighing values (not shown) may be used to determine desired information to output. Thus, for example, if it is determined that a person's age is more important than work status, then the age information may be assigned a weight value which is greater than the work status information. As shown, field 604A may include, for example, multimedia information such as a video clip of one or more desired messages, field 604B may include graphic data, and field 604C may include text data. However, any of these fields may include other types of data, as desired. The displayed fields may be linked to other fields such that selecting any of the displayed fields (e.g., "2. More Federal Housing") will display additional information corresponding to the selected field. Further, a brail and/or audio output may be provided for any of these fields, for the disabled, if desired. Although not shown, selecting candidate "Jane Doherty" will output information relevant to Jane Doherty and/or the selected address or person (e.g., "John Smith"). Further, a suggestion input box (not shown) may be provided to provide a user's (e.g., John Smith's) suggestions to a desired party (e.g., a political party) using the present invention.

Figure 7:
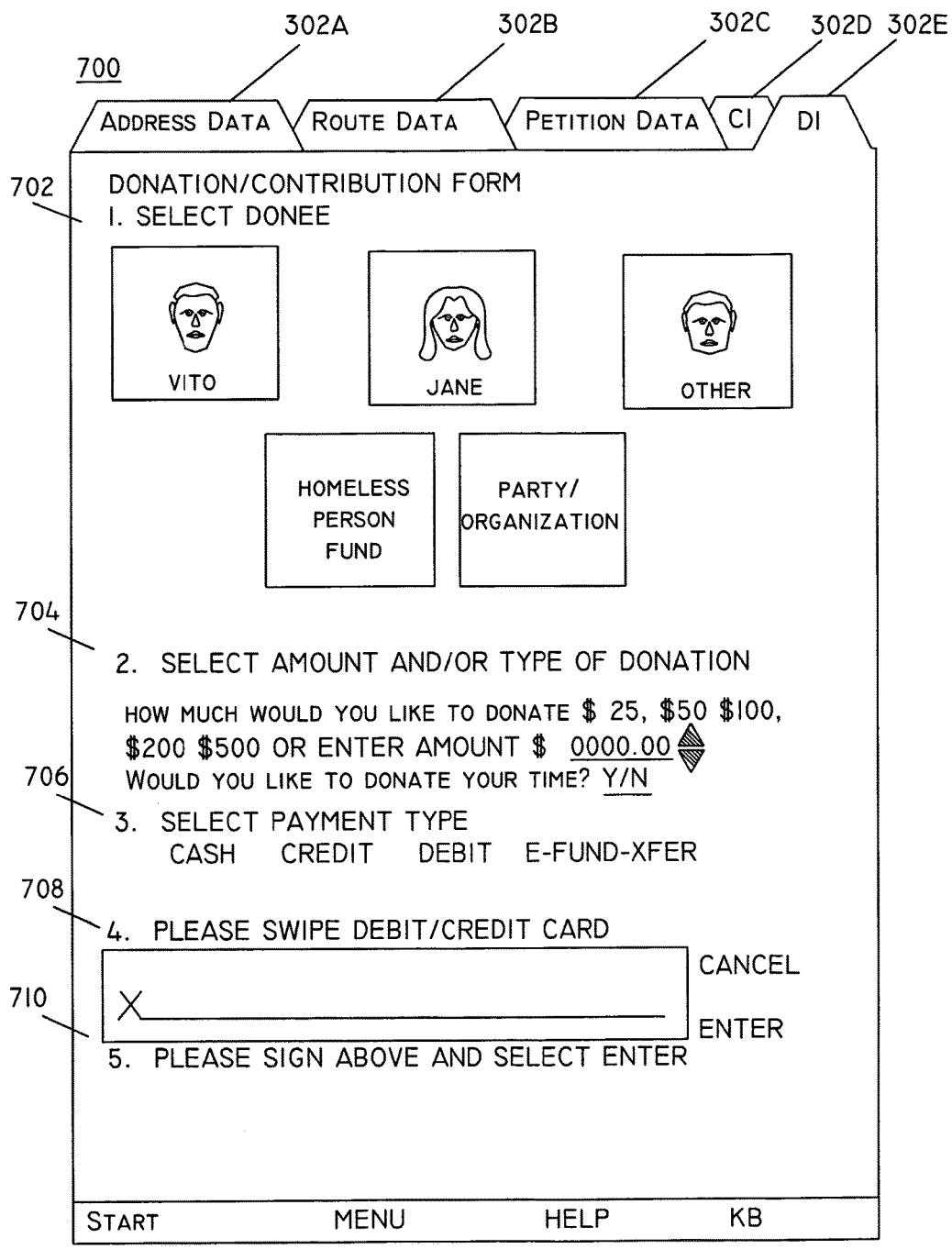
FIG. 7 is a screen shot illustrating a screen corresponding to donation information (DI) according to the present invention.

A screen shot illustrating a screen corresponding to contribution information according to the present invention is shown in FIG. 7. As shown, the contribution information may include a screen 700 which a user (e.g., a selected person, etc.) may use to make a contribution to a desired person (e.g., a candidate), a class of persons (e.g., the poor), an organization (e.g., the Republican Party), etc. Accordingly, a screen 700 includes one or more fields such as, for example, fields 702-710, for processing a desired contribution. Further, an individual may select to contribute time, in which case, a screen (not shown) with desired contribution information such as, for example, contact information (e.g., telephone number), type of work, time available, etc. may be entered. Although not shown, the credit/debit card information may be entered using one or more of a keypad (e.g., soft-keys), the credit card reader, an RF reader (e.g., Paypass™), and Paypal™, etc. Further, an option to track the donation as it is distributed may be provided, as is known in the art. With reference to fields 702-710, field 702 enables a user (e.g., a donor) to select a done; field 704 enables a user to select an amount and/or type of donation; field 706 allows a user to select a payment type (if, for example, a user is not donating time); field 708 outputs a payment command (if, for example, a user is paying using a debit or credit card; field 710 includes a signature box, instructions for signing, and enter and cancel selections for a user to enter his signature or cancel. As shown, the index tabs such as tab 302E, may include predetermined information which may also be set by a user. For example, a user may set tab 302E to read "DI" (e.g., donation information) rather than "OTHER" as illustrated in other drawings, which can enhance a user's convenience. Further, the tabs and other features of the mobile device may be set by downloading information from a system (not shown) in which the mobile device operates.

Figure 8:
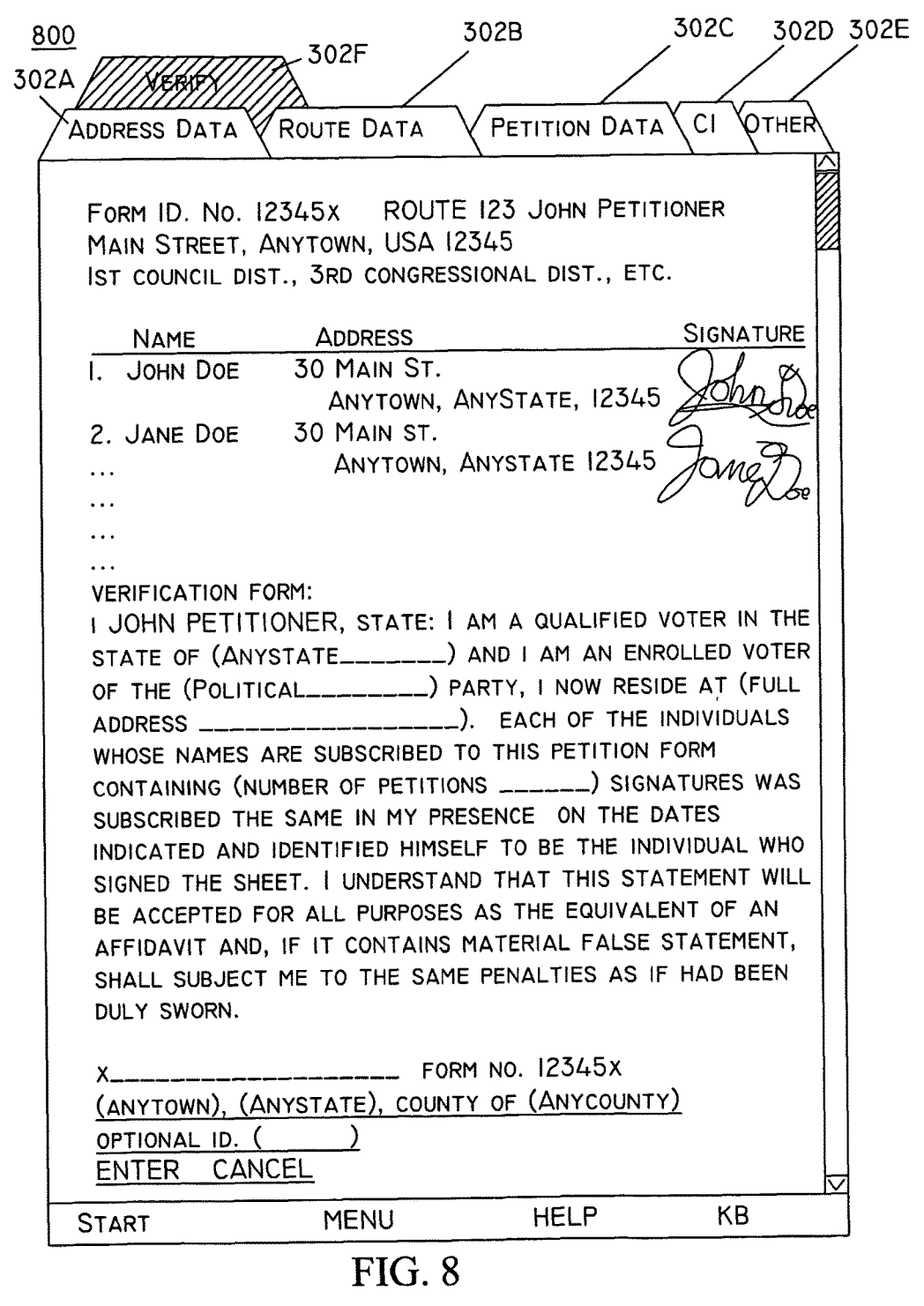

A screen shot of an exemplary verification form used to verify data collected using the mobile device of the present invention is shown in FIG. 8. Screen 800 may include a "statement" as to the accuracy of petition signatures collected using the mobile device 200 and may be accessed using any suitable method such as tab 302F, a menu option, etc. The signature collector (e.g., "John Petitioner") may make a statement as required by various regulations as to the validity of the signatures collected. This statement may be output on screen 800 or may be listed elsewhere. A list of one or more petition signatures and/or other information collected using the mobile device 200 may be displayed on screen 800, in which case a user may have to scroll the screen to sign or otherwise accept or decline the statement (or statements). Further, an agree/do-not-agree button may be provided to agree or not to agree to certain information, as desired, may be provided for the convenience of a user. Other information such as location, number of petitions or number of signatures, address data, etc., may be automatically generated by, for example, the mobile device 200. Further, the mobile device 200 according to the present invention may process and/or verify signatures or other data corresponding to a signatory. For example, rather than signing a form, biometric data (e.g., a fingerprint, voice print) may be substituted for identification purposes. Accordingly, the mobile device 200 may process and save this data with other corresponding data such as name information, address information, etc.

Figure 9:
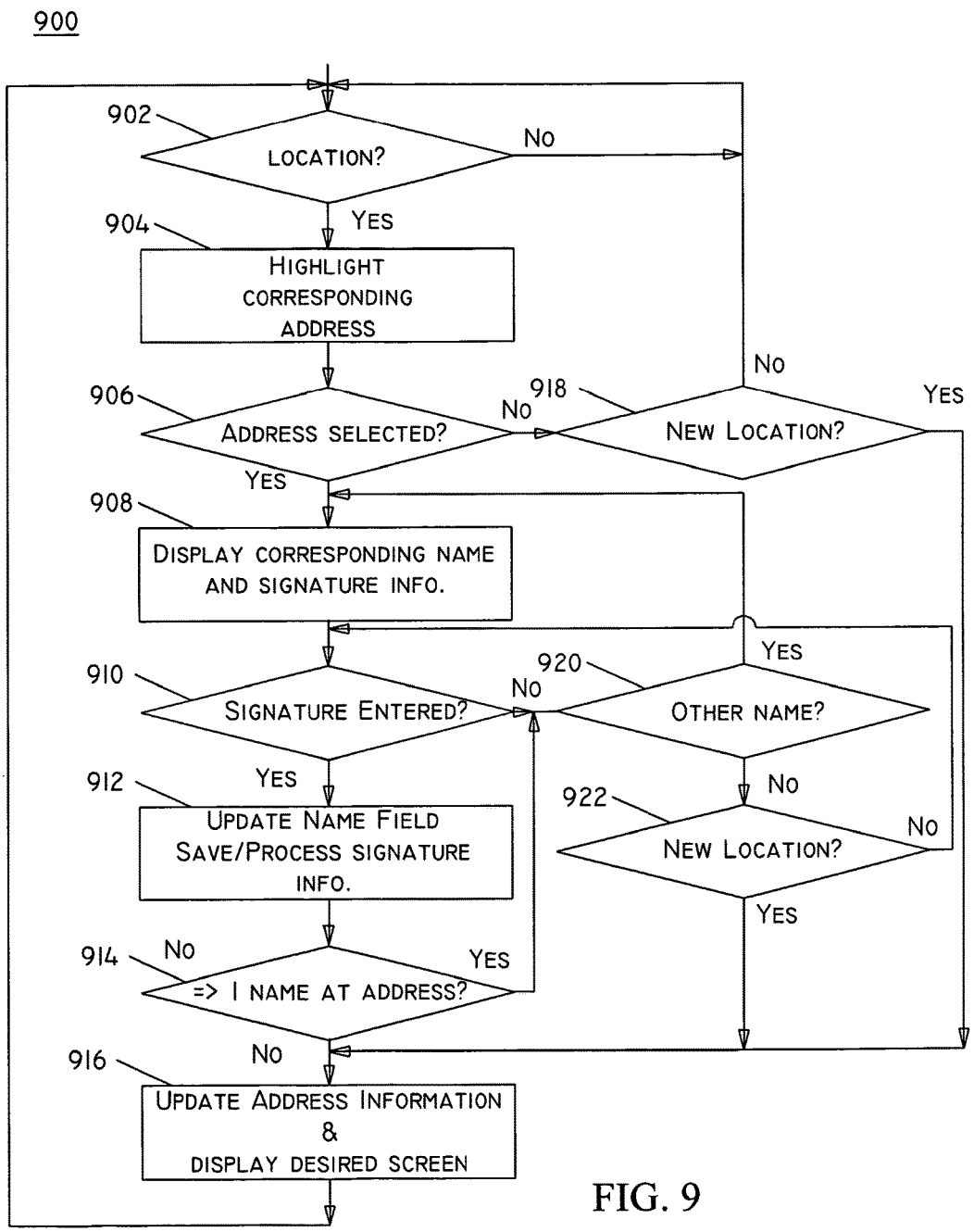
FIG. 9 is a flowchart illustrating operations of a mobile device according to the present invention.

A flowchart illustrating operations of a mobile device according to the present invention is shown in FIG. 9. The mobile device (e.g., via its controller) may perform one or more steps of flowchart 900. The mobile device may perform one or more steps of flowchart 1000. Further, one or more of the steps of flowchart 900 may be performed by a system including the mobile device.

In step 902, the mobile device determines whether it is located at a predetermined location (e.g., at "30 Main St.") If it is determined that the mobile device is at (or located within a predetermined distance of) the predetermined location, the mobile device proceeds to step 904. However, if it is determined that the mobile device is not at (or located within a predetermined distance of) the predetermined location, the mobile device repeats step 902. It should be noted that step 902 may, if desired, be performed only when the mobile device is traveling along a predetermined route. Accordingly, if the mobile device is located away from the predetermined route, it may inform the user of such and provide the user with a manual-address and/or name-input option. Additionally, the mobile device may output instructions, such as, for example, how to proceed to the location which corresponds to the start of the predetermined route. Further, if not located on a selected route, the mobile device may enter (either automatically or via a manual selection) a current location mode in which the mobile device displays current address and name information and/or other corresponding data (e.g., whether the party at the current address is a registered Republican, etc.) so that signatures may be conveniently obtained.

Referring back to the flowchart, in step 904, address (e.g., geographic location) and/or corresponding name information is output (and/or highlighted—as shown in FIG. 3). The mobile device then proceeds to step 906, in which it is determined whether the address and/or corresponding name information is selected by, for example, the user. If it is determined that the address and/or corresponding name information is selected by the user, step 908 is performed. However, in the alternative, step 918 is performed. Referring back to step 906, the address may be selected by the user, if desired (e.g., by a user's setting) rather than by the user.

In step 908, corresponding name and identification information, such as signature information, is displayed using, for example, a screen such as is shown in FIG. 1. However, other screens may be used. For example, a screen having more or less detailed information may be shown. Additionally, if using, for example, biometric data, signature information may not be displayed and/or used. After step 908, the process continues to step 910, in which it is determined whether a signature (or other identification such as biometric data, an identification code, etc.) has been input. If it is determined that this information has been input (e.g., automatically or, for example, by pressing the enter button after a signature is input), the process proceeds to step 912. However, if it is determined that this information has not been received (and/or is not in the process of being entered), the process proceeds to step 920. In step 908, a default name (e.g., John Doe) may be automatically selected, or a user may select a desired name (e.g., Jane Doe). Thus, the mobile device may await a user's input rather than select a name. For example, with reference to FIG. 1, the mobile device may await a user's selection of, for example, John Doe.

In step 912, the identification information is saved and/or processed. During the processing, the identification information may be compared to previously saved data, such as, for example, signature data, biometric data, and identification code data (depending upon the type of input identification information), in order to determine whether the identification and/or other information matches desired information and can be authenticated. However, this is optional and may be performed at other locations (e.g., at a server/DB, etc.). The processing may also include compiling the identification information and/or other information into a desired format for later use. For example, the identification information may be compiled to include corresponding information such as one or more of verification information, address information, etc.

In step 914 it is determined whether there are one or more names still to be entered at the present location. If the determination is affirmative, step 920 is performed. If the determination is negative, step 916 is performed.

In step 916, the address information is updated (e.g., history information as shown in FIG. 5, may be updated to reflect received petition signatures, etc.), and other addresses and/or names may be selected/deselected, etc., to indicate a current status of addresses and/or corresponding name information. For example, with reference to FIG. 3, if identification information such as petition signatures, etc., is received from one or more of John, Jane, and/or Peter Doe, the names and or address (e.g., 30 Main St.) may be deselected, for example, by using a visual identifier, such as by using one or more of a marker (e.g., an "X") a color (e.g., gray letters), a shade, a fill, a highlight, etc., which can readily be recognized as indicating that corresponding information has been collected from the corresponding address. Also, the history information is updated for future reference. Accordingly, repeat visits to a visited location can be avoided, thus increasing efficiency of the collection process. Further, the present invention may also include a system to mark certain addresses and/or names so that information may be collected at a later time. For example, if a user is informed that "Jane and Peter Doe" will be home at a later time and/or on a later date, this information may be input. Thereafter, on or after the later time or date, the user may be alerted to visit a predetermined address such as, for example, "30 Main St.," so that information such as petition signatures, donations, etc., may be collected (e.g., from Jane and Peter Doe) and/or saved (e.g., see, FIG. 5). In the present example, for the sake of illustration, screen 300, 400A or 400B may then be automatically displayed depending upon, for example, a user setting. Step 902 is then repeated.

In step 918, it is determined if the mobile device is at a new location. For example, if the mobile device is now located at "54 Main St.," step 916 is performed. However, if it is determined that the mobile device is not at a new location, step 902 is repeated. Accordingly, if a location such as an address corresponding to "30 Main St." is visited, and no information is collected (e.g., no signatures are obtained) because no one answered the door, this information may be saved (e.g., automatically or via a user's instructions) for later use (e.g., see, FIG. 5). Accordingly, a user may select a "No Answer" icon (not shown) to indicate this fact, and information reflecting such may be saved to memory with the corresponding address. Using this saved information, the address (e.g., 30 Main St.) may be flagged to indicate such for later use. However, if, for example, one or more residents (e.g., John Doe) refused to provide information such as, for example, a petition signature, this fact may be input (e.g., by selecting a "Refused to Sign" icon (not shown), and processed and/or saved for later use (e.g., see, FIG. 5). Accordingly, selected locations and/or addresses may be visited and/or revisited or avoided, as desired. Further, the "No Answer" and "Refused to Sign" icons (or menu-items) may be displayed on various screens such as shown in FIGS. 1, 3, 4A, 4B, and 5.

In step 920 it is determined whether another name corresponding to the present location has been input (e.g., "Jane Doe"). Based upon this determination, the process may continue to steps 908 or 922. For example, if the determination is affirmative (e.g., Jane Doe is selected), step 908 is repeated. However, If the determination is negative, step 922, which is similar to step 918, is performed.

Figure 10:
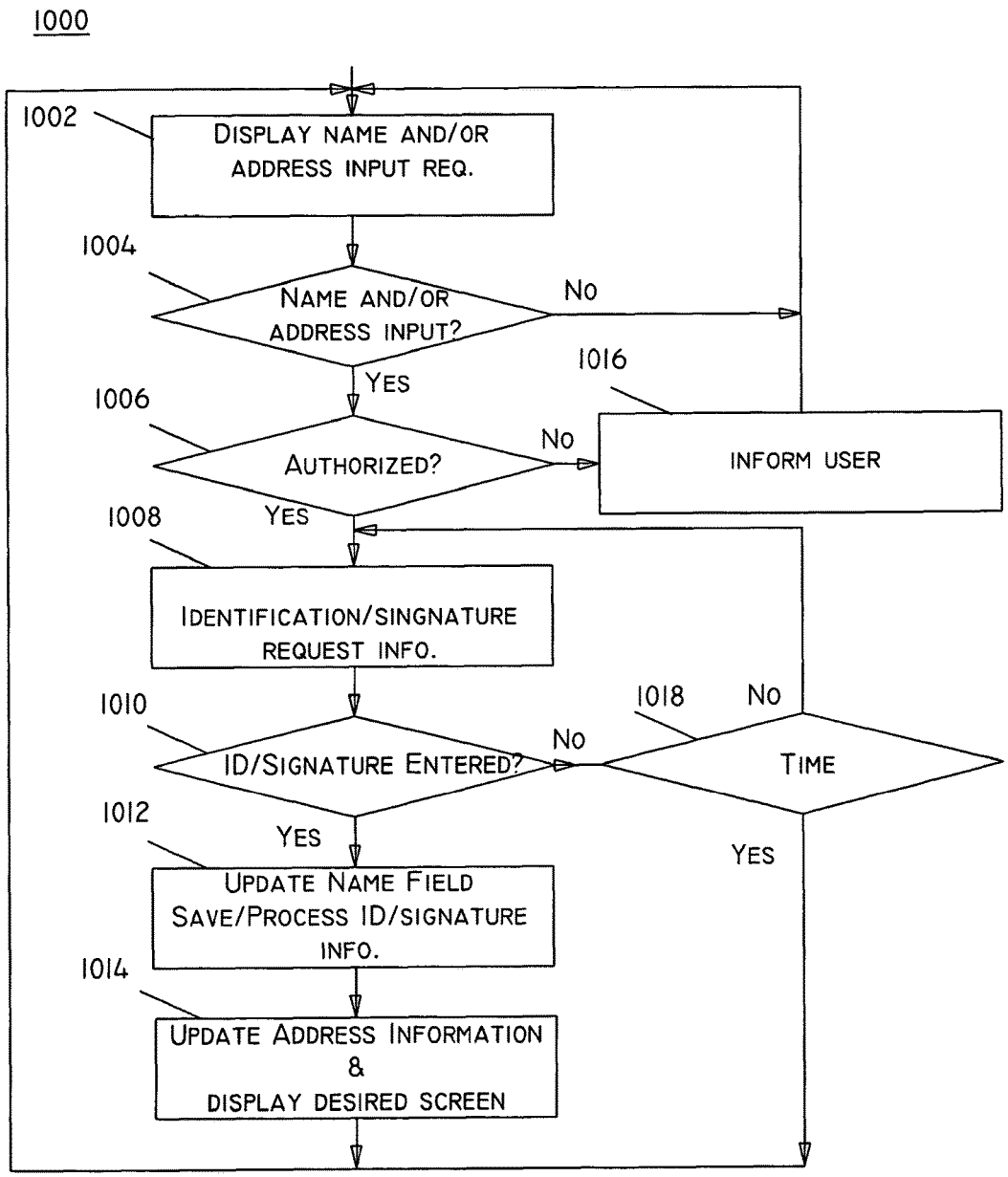
FIG. 10 is a flowchart illustrating operations of a mobile device according to the present invention.

A flowchart illustrating operations of a mobile device according to the present invention is shown in FIG. 10. The mobile device may perform one or more steps of flowchart 1000. Further, one or more of the steps of flowchart 1000 may be performed by a system including the mobile device.

In step 1002, the mobile device outputs a name and/or address input-request information (e.g., audibly and/or visually—see, FIG. 1) for a user to input corresponding name and/or address information, and proceeds to step 1004, in which the mobile device determines whether name and/or address information has been input. The name and/or address input areas may be provided as is shown in FIGS. 1 and 5. Although not shown, the name and/or address input area may be delineated with one or more of first name, middle initial, last name, street address, zip code, state, and voting district area. The voting district area may have entries for various voting district criteria such as, for example, school, council, assembly, congressional and/or senate districts which may be displayed according to election year. For example, council district selections may be output only during a council election year. However, an override may be provided, if desired. When entering requested information, the mobile device according to the present invention may be structured and arranged to provide the user with a predetermined text selection such as is common to Blackberry™-type devices for reducing key presses and/or entry input time. For example, if a user types "Broa," the mobile device according the present invention may output "Broadway" and "Broad St." (e.g., audibly and/or visually) for the user's selection. Moreover, particular address and name databases may be checked so as to provide address and/or name information to the user, which can save time and/or effort. Thus, if "John Doe" is input, a list of addresses for all John Does in a particular area may be output for the user's selection. Further, this information may be output in accordance with a desired election area. For example, if the mobile device is physically located in (or is set to collect petition signatures in) the First Council District, then information corresponding to that area may be output. Thus, if John Doe is registered to vote in the Second Assembly District, the user may be informed of such and/or a petition information (e.g., a user's signature) may be prevented from entry (e.g., to avoid an invalid signature). Accordingly, the collection of invalid petition signatures can be avoided.

In step 1006, it is determined whether the input name and/or address is valid and/or authorized. Thus, for example, if identification information corresponding to a selected individual does not correspond with predetermined information, e.g., election area, etc., the input information would not be authorized and the user informed of such in step 1016. Further, returning to step 1006, other information such as, for example, whether the person has already signed the petition (e.g., on a previous day, etc.) may also be checked during the authorization process. Moreover, other information such as voter registration, election area (which may be checked in this step rather than in step 1004) may also be checked, etc., during the authorization (as opposed to, or in addition to, the checking performed in step 1004). Upon determining that the person is authorized (e.g., that the input name and/or address information corresponds with a correct political party, a correct political district, etc.), the determination is affirmative and the process proceeds to step 1008.

In step 1008, an identifier request is output. Thus, as shown, a signature request may be output. However, the identifier request may include biometric or other identifying data. For example, fingerprint, voice, iris, and palm/hand data may be input. Further, an identification code or other identification such as an RFID may also be input, as desired. In the present embodiment, it will be assumed that a signature is entered using a screen as is shown in FIG. 1.

In step 1010, if it is determined that the identification information has been input, the process proceeds to step 1012. However, if it is determined that the identification information has not been input, the system proceeds to step 1018.

In step 1018, it is determined whether a predetermined time has passed. If it is determined that the predetermined time has passed, step 1002 is repeated. However, if it is determined that that predetermined time has not passed, step 1008 is repeated.

In step 1012, the identification information is saved and/or processed. For example, in the present embodiment, the petitioner's signature may be digitized and/or converted to a desired format (e.g., tiff, jpg. etc.), concatenated with other information e.g., corresponding address, names, dates, time, data corresponding to optional signatories (e.g., "John Petitioner), etc. Thereafter, the system proceeds to step 1014. Further, the process may compare the entered identification information with corresponding predetermined information. Accordingly, an entered signature (or iris print, etc.) may be compared with a file signature (or iris print, etc.) to determine authenticity.

In step 1014, the system may update the address information and/or display a desired screen. For example, as shown in FIG. 5, history data corresponding to the selected address and/or person may be updated. Further, the mobile device may transmit current information to a central system which may include a database (DB) for further storage and/or processing. Moreover, a screen requesting other information such as, for example, a signatory's signature (e.g., "John Petitioner") may be requested after the occurrence of certain events or by a user's or the systems request. These events may be set by the system or a user and may correspond with certain times (e.g., at 12:00 p.m., every three hours, etc.), a certain number of petition signatures (e.g., after every 10 petition signatures are obtained), a certain location (e.g., at political party headquarters), etc. Further, other information may be output as desired after identification information is received.

One or more of the steps shown in FIGS. 9-10 may be optionally performed by another device such as, for example, another mobile device, a server/DB, etc., as desired.

Figure 11:
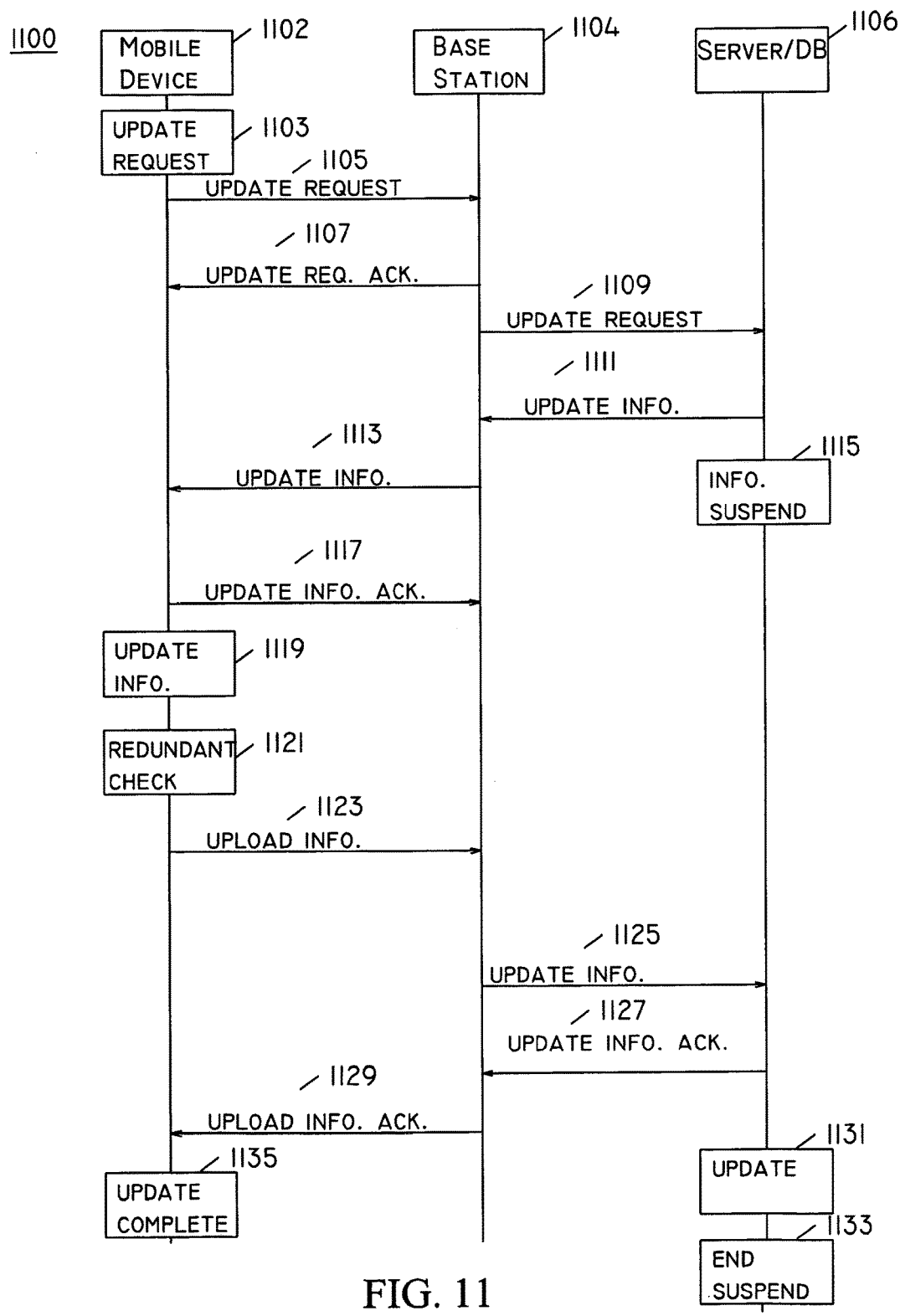
FIG. 11 is a flow diagram illustrating the operation of the mobile device in a system according to the present invention.

A flow diagram illustrating the operation of the mobile device in a system according to the present invention is shown in FIG. 11. The system 1100 may include one or more mobile devices 1102, base stations 1104, and servers/DBs 1106. A synchronization may be performed when updating various information such as, for example, route information, address and/or person information, identification information, verification information, location information, etc. Accordingly, an updating process will be described using an update request generated by the mobile station 1102. However, it should be understood that updates may be performed at the request of, for example, base stations 1104, server/DBs 1106, other mobile devices 1102, etc. Further, the messages sent to and from the mobile devices 1102, base stations 1104, and/or server/DBs 1106 may include information which identifies the transmitting device. Thus, for example, the server/DB 1106 can identify a message transmitted by, for example, mobile device 1102.

With reference to step 1103, an update request is generated by the mobile device 1102. Accordingly, the mobile device 1102 enters an update mode in which, for example, further input of data may be optionally suspended pending completion of the update. However, if desired, information such as ID, etc., may be entered if required by the system 1100.

In Step 1105, an update request is transmitted to the base station 1104. The base station 1104 may be a terrestrial or extraterrestrial base station. However, it is preferred that the base station be a terrestrial base station 1104. In response to the received update request 1105, in step 1107 the base station 1104 transmits an update request acknowledgment to the mobile station 1102. In step 1109, the base station transmits an update request to the server/DB 1106. In response, the server/DB 1106 transmits update information in step 1111. This update information may include updated route information, petition, address, person, and/or verification information, and other information, as necessary. For example, if John Doe signs a petition in a mall (as opposed to his home address) using another mobile device (e.g., 1102B—not shown), his signature information and other corresponding information may be uploaded to the server/DB 1106 by the other mobile device 1102B. Accordingly, the server/DB 1106 may download this information to the mobile device 1102 via the base station 1104 in the update information transmitted in step 1111.

In step 1115, the server/DB 1106 may optionally suspend updating information received from other mobile devices 1106B, until updated information is uploaded to the server/DB 1106 from the current mobile device 1106. Although the suspend operation occurs after the update information is transmitted in step 1111, it may be performed before the update information is transmitted at step 1111.

In step 1113, the update information is transmitted from the base station 1104 to the mobile device 1102. The mobile device 1102 may then acknowledge the received update information by transmitting an acknowledgment message to the base station 1104 in step 1117.

In step 1119, the mobile device 1102 may update current information using the received information. For example, if the update information indicates that "John Doe" has already signed, for example, a petition (corresponding to the current petition), then information (such as, for example, name, address, history, etc.) corresponding to "John Doe" may be updated to reflect this.

In step 1121, the mobile device 1102 may perform a redundancy check to determine whether current, previously-collected information (e.g., collected before performing the update request in step 1103) does not conflict with the received update information. For example, if "John Doe" signed a petition form on the current mobile device, then a redundant signature may exist. Accordingly, this redundant signature may be erased, flagged, or otherwise set aside for further processing (e.g., checking signature information, etc.). Further, the mobile device 1102 may inform the user of this redundant signature and provide the user with options (e.g., archive, delete, flag, etc.), or may transmit this information to the server/DB 1106 for further processing.

In steps 1123 and 1125, the mobile device 1102 uploads current information to the server 1106 via the base station 1104. The current information may, for example, contain information such as signature information, history data, address data, verification information, etc., as desired. For example, signed petitions and corresponding verification information may be transmitted to the server/DB 1106. Further, results of the redundancy check may be transmitted to the server/DB 1106 for further processing (e.g., identification information such as, for example, signature information, biometric information, etc.), and other information (e.g., address, party affiliation, district information) may be checked to determine whether one or both signatures are invalid, valid, etc. Accordingly, the server/DB 1106 may automatically process either or both signatures, may invalidate one or both signatures, and/or may flag either or both of the signatures for further processing (e.g., by a human, etc.), as desired.

In steps 1127 and 1129, the server/DB 1106 may transmit an update information acknowledgment (which indicates that the update information was received) to the mobile device 1102 via base station 1104.

In steps 1131, the server/DB 1106 may update its database, etc. Then, in step 133, the server/DB 1106 may end the suspended state entered into in step 1115.

In step 1135, the mobile device 1102 may complete the update process (e.g., by updating various data, such as, for example, address, route, name, history data, etc. and/or clearing memory areas containing transmitted petition information, identification, information, etc. as desired, to conserve resources.

If desired, the mobile device may transmit only authorized and processed petition forms which contain signatories' identifying information (e.g., signatures) and a signature collector's signed and dated statement.

Although an exemplary flow diagram is described above, other flow diagrams may also be used to perform the processes and methods of the present invention.

Although not shown, the mobile device according to the present invention may output a request which indicates whether another name at the present address will be input.

Certain additional advantages and features of this invention may be apparent to those skilled in the art upon studying the disclosure, or may be experienced by persons employing the novel apparatus and method of the present invention, chief of which is that valuable time and resources are conserved and data may be efficiently and reliably collected.

While the invention has been described with a limited number of embodiments, it will be appreciated that changes may be made without departing from the scope of the original claimed invention, and it is intended that all matter contained in the foregoing specification and drawings be taken as illustrative and not in an exclusive sense.

What is claimed is:

1. A mobile station comprising: an input device; at least one display; and at least one controller configured to: determine a current location of the mobile station; determine at least one address corresponding to the current location of the mobile station; determine expectation data associated with the at least one address corresponding to the current location of the mobile station; and render, on the at least one display, map information corresponding to the current location of the mobile station, and direction information that includes a display of the expectation data.

2. The mobile station according to claim 1, wherein the expectation data indicates a likelihood of success in obtaining a desired item at a corresponding one of the at least one address.

3. The mobile station according to claim 1, wherein the at least one controller is further configured to render, on the at least one display, a name of one or more selected persons that are registered to a corresponding address of the determined at least one address.

4. The mobile station according to claim 1, wherein the at least one controller is further configured to render, on the at least one display, route data corresponding to the current location.

5. The mobile station according to claim 1, wherein the at least one controller is further configured to render, on the at least one display, density information.

6. The mobile station according to claim 1, wherein the controller is further configured to determine guidance information to at least one address of the at least one address.

7. The mobile station according to claim 1, further comprising saving a verification identifier in association with identifiers corresponding to the one or more selected persons.

8. The mobile station according to claim 1, wherein the expectation data indicates a likelihood of success in obtaining a desired item.

9. The mobile station according to claim 1, wherein the at least one controller is further configured to render a name of one or more selected persons that are registered to a corresponding address of the at least one address.

10. The mobile station according to claim 1, wherein the at least one controller is further configured to render route data corresponding to the current location.

11. The mobile station according to claim 1, wherein the at least one controller is further configured to render density information.

12. The mobile station according to claim 1, wherein the display further renders at least one of: a field to select at least one donee and a field to select a type or amount of donation.

13. A method performed by at least one controller of a mobile station having at least one display, the controller configured to perform the acts of: determining a current location of the mobile station; determining at least one address corresponding to the current location of the mobile station; determining expectation data associated with the at least one address corresponding to the current location of the mobile station; and rendering, on the display, map information corresponding to the current location of the mobile station and direction information that includes a display of the expectation data.

14. The method of claim 13, further comprising an act of rendering, on the at least one display, information corresponding to one or more selected persons in association with the at least one address.

15. The method of claim 14, further comprising an act of rendering, on the at least one display, route data corresponding to a route having a plurality of addresses each corresponding to one or more of the one or more selected persons.

16. The method of claim 13, further comprising an act of rendering, on the at least one display, the at least one street address corresponding to the current location.

17. The method of claim 13, further comprising an act of rendering, on the at least one display, guidance information to at least one of the at least one street address.

18. The method of claim 13, further comprising an act of rendering, on the at least one display, density information.

19. A system comprising: at least one mobile station having at least one controller, at least one display, and at least one input device, the at least one controller being configured to: determine a current location and orientation of the mobile station; determine expectation data associated with at least one address corresponding to the determined current location of the mobile station; and render, on the at least one display, map information corresponding to the current location of the mobile station, and direction information that includes a display of the expectation data.

* * * * *